(12) United States Patent
Wang

(10) Patent No.: US 12,526,552 B2
(45) Date of Patent: Jan. 13, 2026

(54) SPARSE 4C2+ PHASE DETECTION AUTO FOCUS AND CORRELATED MULTIPLE SAMPLING

(71) Applicant: OMNIVISION TECHNOLOGIES, INC., Santa Clara, CA (US)

(72) Inventor: Rui Wang, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 171 days.

(21) Appl. No.: 18/322,421

(22) Filed: May 23, 2023

(65) Prior Publication Data

US 2024/0397223 A1   Nov. 28, 2024

(51) Int. Cl.
| | |
|---|---|
| H04N 25/78 | (2023.01) |
| H04N 23/67 | (2023.01) |
| H04N 25/704 | (2023.01) |
| H04N 25/75 | (2023.01) |
| H04N 25/76 | (2023.01) |

(52) U.S. Cl.
CPC ......... *H04N 25/78* (2023.01); *H04N 23/672* (2023.01); *H04N 25/704* (2023.01); *H04N 25/75* (2023.01); *H04N 25/76* (2023.01)

(58) Field of Classification Search
None
See application file for complete search history.

(56) References Cited

U.S. PATENT DOCUMENTS

| | | | |
|---|---|---|---|
| 11,206,039 B1 | 12/2021 | Ebihara | |
| 11,431,936 B2 | 8/2022 | Fan et al. | |
| 11,659,302 B1 | 5/2023 | Tsai et al. | |
| 11,770,634 B1 | 9/2023 | Tian et al. | |
| 12,200,389 B2 | 1/2025 | Ebihara et al. | |
| 12,294,804 B2 | 5/2025 | Guo et al. | |
| 2014/0232913 A1* | 8/2014 | Sakane | H10F 39/8057 348/294 |
| 2015/0138408 A1 | 5/2015 | Lee | |
| 2020/0153440 A1 | 5/2020 | Sakurai et al. | |
| 2020/0275045 A1* | 8/2020 | Higashi | H03M 1/64 |
| 2021/0329185 A1* | 10/2021 | Fan | H03M 1/56 |

(Continued)

OTHER PUBLICATIONS

U.S. Appl. No. 17/934,196, filed Sep. 21, 2022, Fan et al.
U.S. Appl. No. 18/047,588, filed Oct. 18, 2022, Wang.

*Primary Examiner* — Twyler L Haskins
*Assistant Examiner* — Wesley J Chiu
(74) *Attorney, Agent, or Firm* — Dorsey & Whitney LLP

(57) ABSTRACT

An arithmetic logic unit includes a GC to binary stage, an adder stage, an adder output stage, an adder input latch stage coupled to latch outputs of the GC to binary stage, a feedback multiplexer stage coupled to receive the outputs of the GC to binary stage, a latch output multiplexer coupled to receive outputs of the first adder input latches, where the latch output multiplexer is configured to multiply the outputs of the first adder input latches by either −1 or −2, and an adder input multiplexer stage, where first inputs of the adder input multiplexer stage are coupled to receive outputs of the latch output multiplexer and second inputs of the adder input multiplexer stage are coupled to receive outputs of the second adder input latches. The arithmetic logic performs adaptive correlated multiple sampling for image sensing pixels and phase detection auto focus for other pixels.

19 Claims, 7 Drawing Sheets

(56) References Cited

U.S. PATENT DOCUMENTS

| | | |
|---|---|---|
| 2022/0210359 A1 | 6/2022 | Shikina |
| 2022/0269482 A1 | 8/2022 | Fan et al. |
| 2023/0171523 A1* | 6/2023 | Lee ..................... H04N 25/771 |
| | | 348/302 |
| 2023/0262363 A1* | 8/2023 | Lee ........................ H03M 7/28 |
| | | 348/308 |
| 2024/0098376 A1* | 3/2024 | Fan ....................... H04N 25/75 |
| 2024/0129650 A1* | 4/2024 | Wang ..................... H04N 25/78 |
| 2024/0397226 A1* | 11/2024 | Guo ......................... G06F 7/57 |
| 2024/0397236 A1 | 11/2024 | Ebihara et al. |

* cited by examiner

| PDAF (574) | Sig1 saturated (572) | timing (530) | wire (558) | Lat1 (532a) | Lat2 (532b) | ALU operation (538) | Output latch (540b) | Output PDAF latch (540a) |
|---|---|---|---|---|---|---|---|---|
| NO | NO / Adaptive CMS | 1st ramp | rst | rst | | | | |
| | | 2nd ramp | sig1 | rst | | | | |
| | | 3rd ramp | sig2 | rst | sig1-rst-rst | Wire − Lat1*2 | | |
| | YES / No CMS | 1st ramp | rst | rst | | | | |
| | | 2nd ramp | sig1 | rst | | | | |
| | | 3rd ramp | sig2 | rst | sig1-rst-rst | (Wire + Lat2) / 2 → (sig1+sig2)/2-rst | | |
| YES | NO / PDAF | 1st ramp | rst | rst | | | | |
| | | 2nd ramp | sig1=sigL | rst | PDAF_flag | Wire − Lat1 → sig2 − rst | | |
| | | 3rd ramp | sig2=sigL+sigR | rst | PDAF_flag | Wire − Lat1 → sig2-rst | PDAF_flag → Wire − Lat1 → sig1-rst | |
| | YES / Flag saturated PDAF | 1st ramp | rst | rst | | | | |
| | | 2nd ramp | sig1 | rst | | Wire − Lat1 → sig2-rst | | Flag saturated PDAF |
| | | 3rd ramp | sig2 | rst | | | | |

*FIG. 5*

| PDAF (674) | Sig1 saturated (672) | Adaptive CMS | timing (630) | wire (658) | Lat1 (632a) | Lat2 (632b) | ALU operation (638) | Output latch (640b) | Output PDAF latch (640a) |
|---|---|---|---|---|---|---|---|---|---|
| NO | NO | Adaptive CMS | 1st ramp | rst1 |  | rst1 |  |  |  |
|  |  |  | 2nd ramp | rst2 | (rst1+rst2)/2 |  | (Wire + Lat2)/2 |  |  |
|  |  |  | 3rd ramp | sig1 | (rst1+rst2)/2 | sig1-rst1-rst2 | Wire − Lat1*2 |  |  |
|  |  |  | 4th ramp | sig2 | (rst1+rst2)/2 | sig1-rst-rst2 | (Wire + Lat2)/2 | (sig1+sig2-rst1-rst2)/2 |  |
|  | YES | No CMS | 1st & 2nd | rst2 | (rst1+rst2)/2 |  |  |  |  |
|  |  |  | 3rd ramp | sig1 | (rst1+rst2)/2 |  | Wire − Lat1 |  |  |
|  |  |  | 4th ramp | sig2 | (rst1+rst2)/2 |  | Wire − Lat1 | sig2 − rst |  |
| YES | NO | PDAF | 1st & 2nd | rst2 | (rst1+rst2)/2 | PDAF flag |  |  |  |
|  |  |  | 3rd ramp | sig1=sigL | (rst1+rst2)/2 | PDAF flag | Wire − Lat1 | sig1-rst |  |
|  |  |  | 4th ramp | sig2=sigL+sigR | (rst1+rst2)/2 |  | Wire − Lat1 | sig2-rst |  |
|  | YES |  | 1st & 2nd | rst2 | (rst1+rst2)/2 |  |  |  |  |
|  |  |  | 3rd ramp | sig1 | (rst1+rst2)/2 |  | Wire − Lat1 | sig2-rst |  |
|  |  |  | 4th ramp | sig2 | (rst1+rst2)/2 |  | Wire − Lat1 | sig2-rst | Flag saturated PDAF |

*FIG. 6*

SPARSE 4C2+ PHASE DETECTION AUTO FOCUS AND CORRELATED MULTIPLE SAMPLING

TECHNICAL FIELD

This disclosure relates generally to image sensors, and in particular but not exclusively, relates to high dynamic range (HDR) complementary metal oxide semiconductor (CMOS) image sensors.

BACKGROUND

Image sensors have become ubiquitous and are now widely used in digital cameras, cellular phones, security cameras, as well as in medical, automotive, and other applications. As image sensors are integrated into a broader range of electronic devices, it is desirable to enhance their functionality, performance metrics, and the like in as many ways as possible (e.g., resolution, power consumption, dynamic range) through both device architecture design as well as image acquisition processing. The technology used to manufacture image sensors has continued to advance at a great pace. For example, the demands of higher resolution and lower power consumption have encouraged the further miniaturization and integration of these devices.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to produce digital images (e.g., image data) representing the external scene. The analog image signals on the bitlines are coupled to readout circuits, which include input stages having analog-to-digital conversion (ADC) circuits to convert those analog image signals from the pixel array into the digital image signals.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 5 is a table illustrating example sequences of operations performed by an example arithmetic logic unit in accordance with the teachings of the present disclosure.

FIG. 6 is a table illustrating other example sequences of operations performed by an example arithmetic logic unit in accordance with the teachings of the present disclosure.

Figure 1:
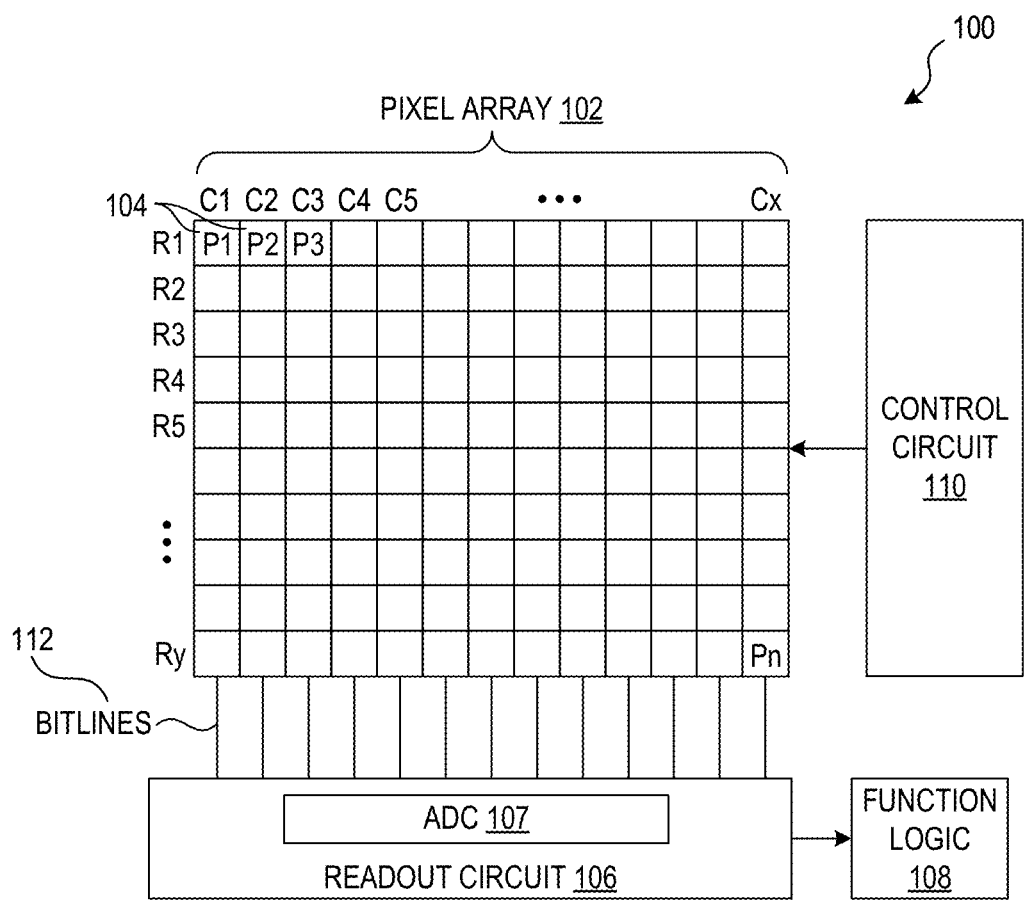
FIG. 1 illustrates one example of an imaging system including a pixel array in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

Examples directed to an imaging system with arithmetic logic units performing phase detection auto focus and adaptive correlated multiple sampling are disclosed. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present disclosure. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for case of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system with arithmetic logic units performing phase detection auto focus (PDAF) and adaptive correlated multiple sampling (CMS) are disclosed. PDAF operates by using a first set of one or more photodiodes for detecting light from one side, using a second set of one or more photodiodes for detecting light from the other side, and measuring the phase difference between the two sets of photodiodes to determine the degree of autofocus needed for the particular image. Adaptive CMS operates by performing CMS when the benefits of using CMS outweigh the costs of using CMS, such as in dark conditions when the signal is small and random noise from components of the readout circuit dominate.

In various examples, an arithmetic logic unit (ALU) includes a front end latch stage coupled to a Gray code (GC) generator to latch GC outputs of the GC generator in response to a comparator output, a signal latch stage coupled to latch outputs of the front end latch stage in response to a signal latch enable signal, a GC to binary stage coupled to generate a binary representation of the GC outputs latched in the signal latch stage, an adder stage including first inputs and second inputs, where the first inputs of the adder stage are coupled to receive outputs of the GC to binary stage, where outputs of the adder stage are generated in response to the first inputs and the second inputs of the adder stage, and an adder output stage coupled to receive the outputs of the adder stage, where the adder output stage is configured to divide the outputs of the adder stage by either 1 or 2. The ALU also includes an adder input latch stage coupled to latch outputs of the GC to binary stage, including first adder input latches configured to latch the outputs of the GC to binary stage in response to a first adder input latch enable signal, and second adder input latches configured to latch the outputs of the GC to binary stage in response to a second adder input latch enable signal. The ALU further includes a feedback multiplexer stage coupled to receive the outputs of the GC to binary stage, including a first feedback multiplexer with first inputs coupled to receive outputs of the adder output stage and second inputs coupled to receive the outputs of the GC to binary stage, and a second feedback multiplexer with first inputs coupled to receive outputs of the adder output stage and second inputs coupled to receive the outputs of the GC to binary stage. The ALU further includes a latch output multiplexer coupled to receive outputs of the first adder input latches, where the latch output multiplexer is configured to multiply the outputs of the first adder input latches by either −1 or −2, and an adder input multiplexer stage, where first inputs of the adder input multiplexer stage are coupled to receive outputs of the latch output multiplexer and second inputs of the adder input multiplexer stage are coupled to receive outputs of the second adder input latches.

In various examples, a method of operating an ALU includes configuring a Gray code (GC) to binary stage to output a reset signal, configuring first adder input latches of an adder input latch stage to latch the reset signal in response to a first adder input latch enable signal, and configuring the GC to binary stage to output a first image signal. Upon determining that the ALU is coupled to an image sensing pixel and that the first image signal is not saturated, the method further includes configuring a latch output multiplexer to multiply outputs of the first adder input latches by −2, configuring an adder stage to sum outputs of the latch output multiplexer and the first image signal from the GC to binary stage, configuring second adder input latches of the adder input latch stage to latch outputs of the adder stage, configuring the GC to binary stage to output a second image signal, configuring the adder stage to sum outputs of the second adder input latches and the second image signal from the GC to binary stage, and configuring an adder output stage to divide outputs of the adder stage by 2.

To illustrate, FIG. 1 shows one example of an imaging system 100 having a readout circuit 106 in accordance with the teachings of the present disclosure. In particular, the example depicted in FIG. 1 illustrates an imaging system 100 that includes a pixel array 102, bitlines 112, a control circuit 110, a readout circuit 106, and function logic 108. In one example, pixel array 102 is a two-dimensional (2D) array including a plurality of pixel circuits 104 (e.g., P1, P2, . . . . Pn) that are arranged into rows (e.g., R1 to Ry) and columns (e.g., C1 to Cx) to acquire image data of a person, place, object, etc., which can then be used to render an image of a person, place, object, etc. In various examples, the pixel circuits P1, P2, . . . . Pn include photodiodes that are configured to provide image data as well as photodiodes that are configured to provide PDAF data. In various examples, the photodiodes that are configured to provide PDAF data may be interspersed among the photodiodes that are configured to provide image data.

In various examples, the readout circuit 106 may be configured to read out the image signals through the column bitlines 112. As will be discussed, in the various examples, readout circuit 106 may include an analog-to-digital converter (ADC) 107 in accordance with the teachings of the present disclosure. In the example, the digital image data values generated by the analog to digital converters in readout circuit 106 may then be received by function logic 108. Function logic 108 may simply store the digital image data or even manipulate the digital image data by applying post image effects (e.g., crop, rotate, remove red eye, adjust brightness, adjust contrast, or otherwise).

In one example, control circuit 110 is coupled to pixel array 102 to control operation of the plurality of photodiodes in pixel array 102. For example, control circuit 110 may generate a rolling shutter or a shutter signal for controlling image acquisition. In other examples, image acquisition is synchronized with lighting effects such as a flash.

In one example, imaging system 100 may be included in a digital camera, cell phone, laptop computer, an endoscope, a security camera, or an imaging device for automobile, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
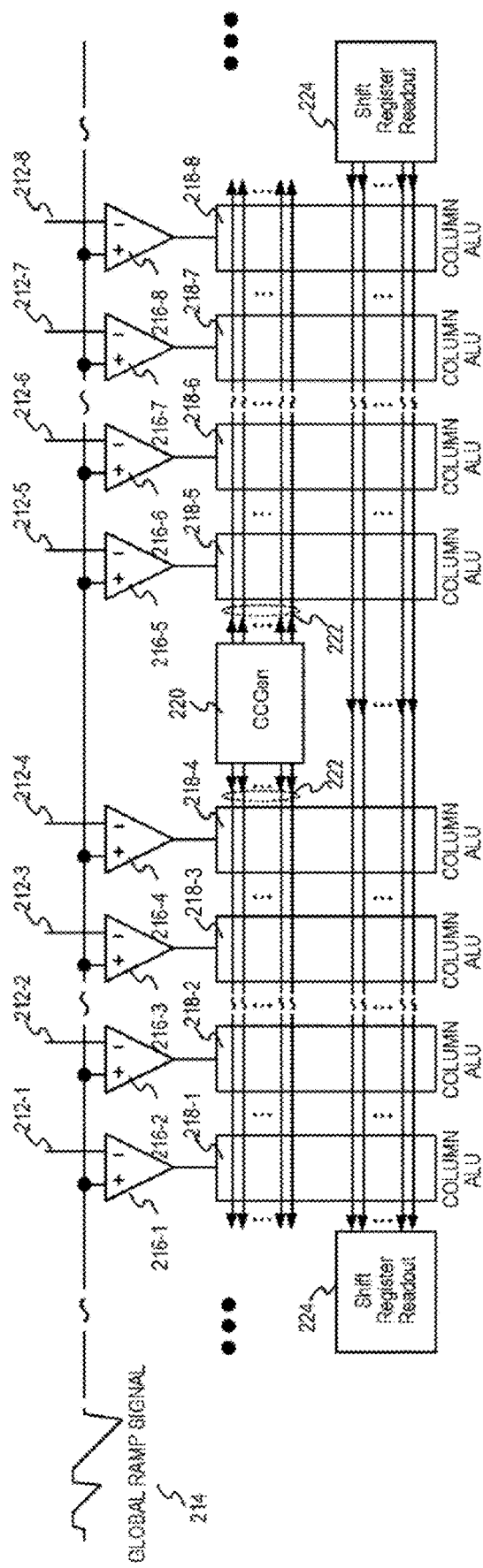
FIG. 2 illustrates a portion of an example readout circuit including column analog-to-digital conversion with a Gray code generator and parallel column arithmetic logic units in accordance with the teachings of the present disclosure.

FIG. 2 illustrates a portion of an example readout circuit 206 including column analog-to-digital conversion with a Gray code generator 220 and parallel column arithmetic logic units (ALUs) 218 in accordance with the teachings of the present disclosure. It is appreciated that the readout circuit 206 of FIG. 2 may be an example of the readout circuit 106 included in the imaging system 100 as shown in FIG. 1, and that similarly named and numbered elements described above are coupled and function similarly below.

As shown in the example depicted in FIG. 2, the portion of readout circuit 206 includes a plurality of comparators 216. Each one of the plurality of comparators 216 is coupled to receive a ramp signal 214, which in one example is a global ramp signal. Each one of the plurality of comparators 216 is further coupled to a respective one of a plurality of column bit lines 212 from an image sensor to receive a respective analog image or phase detection auto focus (PDAF) data signal from a column of the image sensor. As shown in the example, the outputs of the plurality of comparators 216 are coupled in parallel to respective column ALUs 218. Each one of the plurality of ALUs 218 is also coupled to receive Gray code (GC) outputs 222 that are generated by a shared Gray code (GC) generator 220 as shown. In one example, the GC outputs 222 that are generated by the GC generator 220 are phase-aligned 13-bit Gray code signals.

In operation, each one of the plurality of comparators 216 is coupled to generate a respective comparator output in response to a comparison of the respective analog image or PDAF data signal received from the respective bit line 212 and the ramp signal 214. In one example, when the voltage of the ramp signal 214 ramps down to a value equal to or less than the voltage of the analog image or PDAF data signal carried by the respective column bit line 212, a falling edge occurs at the output of the respective comparator 216. In the example, each respective column ALU 218 is coupled to sample and hold, or latch, the 13-bit Gray code signal 222 received from the GC generator 220 when the falling edge occurs at the output of the respective comparator 216 that is coupled to the respective column ALU 218. In the various examples, each column ALU 218 is then configured to perform Gray code to binary code conversion on the latched GC code signal 222.

In various examples, the column ALUs 218 are configured to extract the image signals as well as the PDAF signals and store the signals locally in the column ALUs. By extracting and storing the PDAF signal locally inside the column ALUs 218 instead of in image signal processors external to the column ALUs 218, it is appreciated that digital power consumption is reduced in accordance with the teachings of the present disclosure. In various examples, the column ALUs 218 may also be coupled perform correlated multiple sampling (CMS) or operations in parallel by determining a difference between one or more reset signals and one or more data signals from the respective column bit lines 212 to generate normalized digital image signal or PDAF data from the image sensor in accordance with the teachings of the present disclosure. In one example, the digital image or PDAF signal data extracted and stored within the column ALUs 218 may then be output to respective global read bit lines of the readout circuit 206.

In one example, the portion of readout circuit 206 shown in FIG. 2 may be one of a plurality of portions of readout circuit 206 that are repeated or "stitched together" across the columns of an image sensor array. In the example shown in FIG. 2, the image signal outputs from the column ALUs 218 may therefore be relayed from "right" to "left" through the column ALUs 218 of each portion of readout circuit 206, and with shift register readouts 224 coupled to the first and last columns and interspersed between every N columns of the image sensor array, to readout out the image or PDAF data from the image sensor array. For instance, in an example of a 48 megapixel sensor array, there are 8,000 columns. In the example, a single GC generator 220 may be shared among each N=500 columns of the sensor array, such that a total of 16× portions of readout circuit 206 shown in FIG. 2 are included between shift register readouts 224 coupled to the first and last columns and interspersed every 500 columns to readout the image signal outputs from the sensor array. In other words, shift readout registers 224 are coupled to respective ALUs 218 that are coupled to the first and last columns of the image sensor. In addition, shift registers 224 are coupled to and are interspersed between the plurality of ALUs 218 of each one of the plurality of readout circuits 206 to readout the respective digital image data signals from the plurality of ALUs 218.

Figure 3:
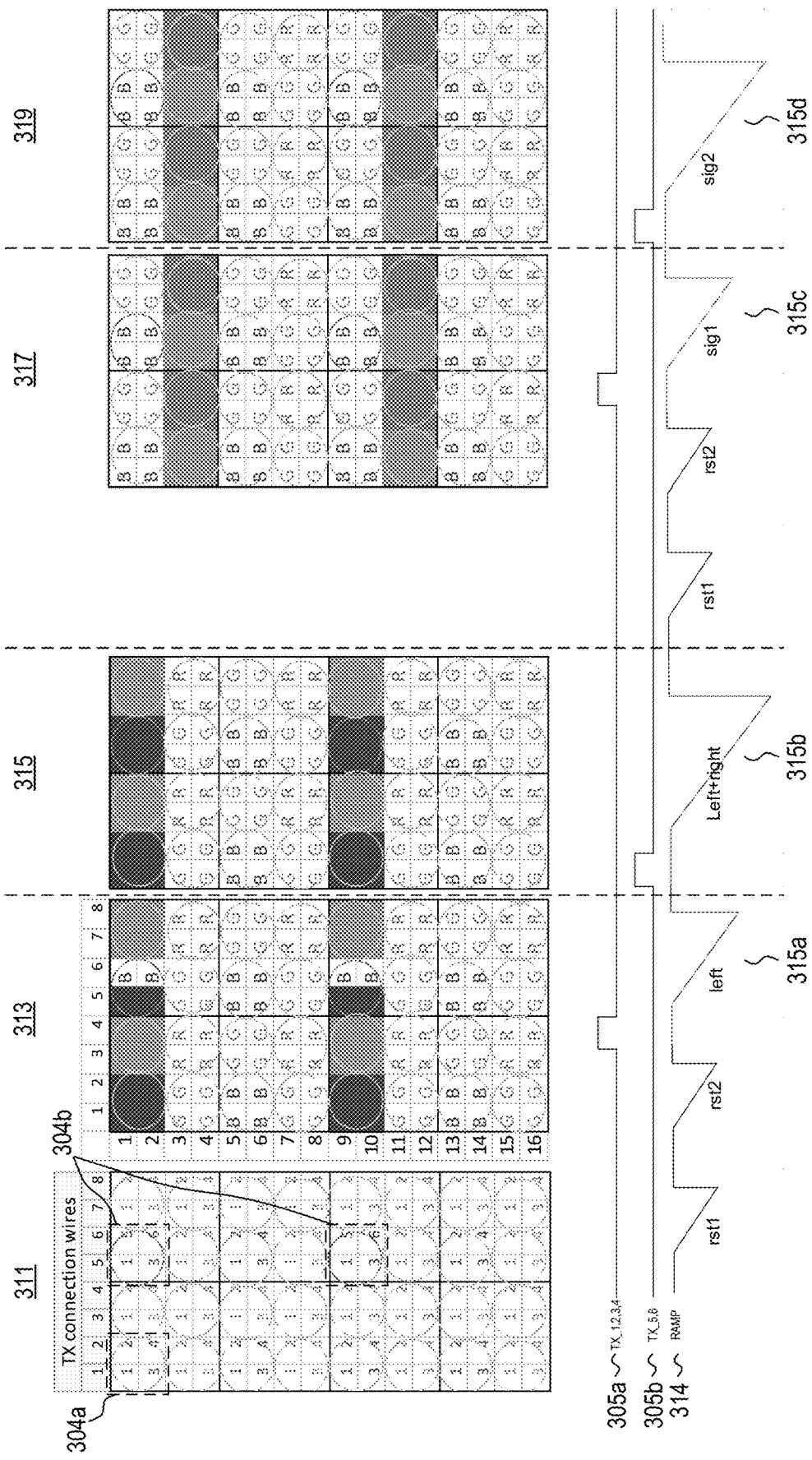
FIG. 3 illustrates controls for pixels during a readout period in accordance with the teachings of the present disclosure.

FIG. 3 illustrates controls for pixels 304 during a readout period in accordance with the teachings of the present disclosure. It is appreciated that the pixels 304 of FIG. 3 may be examples of the pixels 104 included in the imaging system 100 as shown in FIG. 1, and that similarly named and numbered elements described above are coupled and function similarly below.

In the illustrated embodiment, each pixel 304 includes four photodiodes and four transfer transistors. Each transfer transistor is configured to be controlled by one of six different control signals labeled 1 through 6, as shown in diagram 311. The pixels 304 can be either an image sensing pixel 304a or a phase detection autofocus (PDAF) pixel 304b. The transfer transistors of image sensing pixels 304a are configured to be controlled via control signals 1 through 4, while the PDAF pixels 304b are configured to be controlled via control signals 1, 3, 5, and 6. In the illustrated embodiment, PDAF pixels 304b are located every three pixels in each row and every four rows. In other embodiments, different arrangements of PDAF pixels 304b are possible.

Referring to the timing diagram, which illustrates the transfer control signals 1 through 4 305a, the transfer control signals 5 and 6 305b, and the ramp 314, a first ramp signal 315a corresponds to left-side PDAF extraction via PDAF pixels 304b per diagram 313. A second ramp signal 315b corresponds to left-and-right-sides PDAF extraction per PDAF pixels 304b per diagram 315. A third ramp signal 315c corresponds to a first image signal readout per image sensing pixels 304a per diagram 317. A fourth ramp signal 315d corresponds to a second image signal readout per image sensing pixels 304a per diagram 319. As shown, the transfer control signals 1 through 4 305a are pulsed simultaneously prior to the left-side PDAF extraction ramp signal 315a and the first image signal ramp signal 315c. The transfer control signals 5 and 6 305b are pulsed simultaneously prior to the left-and-right-side PDAF extraction ramp signal 315b, allowing partially independent control of image sensing pixels 304a and PDAF pixels 304b.

Figure 4:
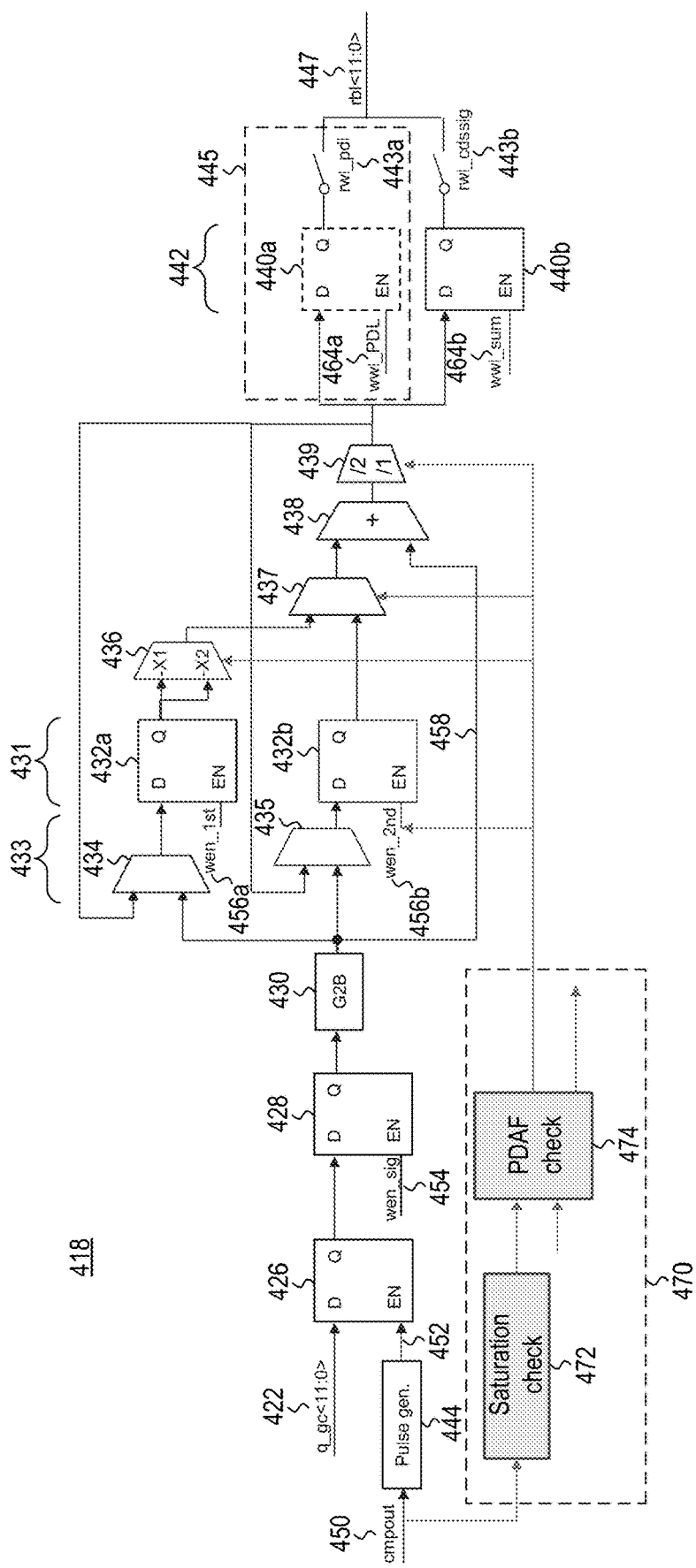
FIG. 4 illustrates a portion of an example arithmetic logic unit in accordance with the teachings of the present disclosure.

FIG. 4 illustrates a portion of an example arithmetic logic unit (ALU) 418 in accordance with the teachings of the present disclosure. It is appreciated that the ALU 418 of FIG. 4 may be an example of one of the ALUs 218 included in readout circuit 206 as shown in FIG. 2, and that similarly named and numbered elements described above are coupled and function similarly below. It is also appreciated that the portion of ALU 418 depicted in FIG. 4 illustrates circuitry that processes one of the bits of an ALU 418. For instance, in the various examples, it is noted that each one of the plurality of ALUs 418 is coupled to sample and hold or latch a corresponding bit of a received 12-bit Gray code q_gc<11:0> 422 in response to the arrival of a falling edge of comparator output cmpout 450 to complete the analog-todigital conversion by converting the latched 12-bit Gray code q_gc<11:0> 422 to a binary value.

To illustrate, the example ALU 418 shown in FIG. 4 includes a front end latch stage 426 coupled to receive and latch a respective bit of Gray code q_gc<11:0> 422 signal in response to comparator output cmpout 450. In the illustrated example, each latch of front end latch stage 426 has a data input "D" coupled to receive the respective bit of Gray code q_gc<11:0>. ALU 418 also includes a pulse generator 444 that is coupled to receive the comparator output cmpout 450 from the respective comparator (e.g., comparator 216) of the column. In one example, the pulse generator 444 is coupled to generate a front end latch enable signal 452 in response to the arrival of a falling edge in the comparator output cmpout 450. In one example, the pulse of front end latch enable signal 452 is coupled to an enable input of each latch of front end latch stage 426.

In the depicted example, ALU 418 also includes a signal latch stage 428 coupled to the output of the front end latch stage 426. In operation, the signal latch stage 428 is coupled to latch outputs of the front end latch stage 426 in response to a signal latch enable signal wen_sig 454. As shown in the depicted example, each latch of the signal latch stage 428 includes a data input "D" coupled to the "Q" output of a respective one of latches of the front end latch stage 426. The example in FIG. 4 shows that ALU 418 also includes a GC to binary stage (e.g., G2B) 430 that is coupled to generate binary representations of the Gray code q_gc<11:0> 422 signal values latched in the front end latch stage 426. In one example, GC to binary stage 430 includes a plurality of exclusive-OR gates (not shown), each of which has an output coupled to generate the corresponding binary bit, and a first input coupled to receive a respective "Q" output of the respective latch of signal latch stage 428.

As shown in the depicted example depicted in FIG. 4, the ALU 418 also includes an adder stage 438, which includes a plurality of full adders, each of which having a first input coupled to an output of the GC to binary stage 430 through wire 458, and a second input coupled to an output of an adder input multiplexer stage 437, which will be described in greater detail below. In operation, the outputs of the adder stage 438 are generated in response to the first inputs from the GC to binary stage 430 and the second inputs from the adder input multiplexer stage 437, and sent to an adder output stage 439, which is configured to divide the outputs of the adder stage by either 1 or 2. In one example, the outputs of adder stage 438 are configured to determine the difference between the values received at the first inputs and the values received at second inputs of the adder input multiplexer stage 437.

Continuing with the example depicted in FIG. 4, the ALU 418 further includes an adder input latch stage 431 coupled to latch outputs of the GC to binary stage 430. In one example, the adder input latch stage 431 includes first adder input latches 432a, which are configured to latch the outputs of the GC to binary stage 430 in response to a first adder input latch enable signal wen_1st 456a. In the example, the adder input stage 431 also includes second adder input latches 432b, which are configured to latch the outputs of the GC to binary stage 430 in response to a second adder input latch enable signal wen_2nd 456b. In the depicted example, a latch output multiplexer 436 is coupled to receive outputs of the first adder input latches 432a and is configured to multiply the outputs of the first adder input latches by either −1 or −2. Alternatively, the adder stage 438 can be used to effectively multiply the outputs of the first adder input latches by either −1 or −2.

The ALU 418 can also include a feedback multiplexer stage 433 coupled to receive the outputs of the GC to binary stage 430. In the illustrated example, the feedback multiplexer stage 433 includes a first feedback multiplexer 434 with first inputs coupled to receive outputs of the adder output stage 439 and second inputs coupled to receive the outputs of the GC to binary stage 430, and a second feedback multiplexer 435 with first inputs coupled to receive outputs of the adder output stage 439 and second inputs coupled to receive the outputs of the GC to binary stage 430. In operation, the first adder input latches 432a are coupled to latch outputs of the first feedback multiplexer 434, and the second adder input latches 432b are coupled to latch outputs of the second feedback multiplexer 435.

The example in FIG. 4 shows that ALU 418 also includes a data latch stage 442 coupled to latch outputs of the adder output stage 439. As shown in the depicted example, the data latch stage 442 includes first data latches 440a and second data latches 440b. As will be discussed in greater detail below, the first data latches 440a are configured to latch phase detection signals from the outputs of the adder output stage 439 in response to a first data latch enable signal wwl_PDL 464a, and the second data latches 440b are configured to latch image data signals from the outputs of the adder output stage 439 in response to a second data latch enable signal wwl_sum 464b. In the illustrated example, the phase detection signals latched in first data latches 440a and the image data signals latched in second data latches 440b are output from ALU 418 as output bits rbl<11:0> 447 through output switches rwl_pdl 443a and rwl_cdssig 443b, respectively.

ALU 418 can also include a determination block 470 coupled to receive the comparator output cmpout 450 and configured to output at least one of the second adder input latch enable signal wen_2nd 456b, a control signal for the latch output multiplexer 436, a control signal for the adder input multiplexer stage 437, and a control signal for the adder output stage 439. The determination block 470 can include at least one of a saturation circuit 472 configured to determine saturation of a signal (e.g., a PDAF signal, an image signal) and a PDAF circuit 474 configured to determine whether the particular ALU 418 is coupled to a PDAF pixel or an image sensing pixel. As will be described in further detail below with respect to FIGS. 4 and 5, the determination block 470 can control the specific operations performed by the ALU 418 based on whether a PDAF pixel or an image sensing pixel is coupled, and whether a data signal is saturated. In other embodiments, the determination block 470 can be external to the ALU 418.

FIG. 5 is a table illustrating example sequences of operations performed by an example arithmetic logic unit in accordance with the teachings of the present disclosure. It is appreciated that the sequences of operations illustrated in FIG. 5 may be example sequences of operations performed by the ALU 418 of FIG. 4, and that similarly named and numbered elements described above are coupled and function similarly below.

As shown in FIG. 5, there can be at least four different sequences of operations, labeled I, II, III, and IV. The ALU can be configured to choose among these different sequences of operations based on the outputs of a determination block (e.g., the determination block 470 illustrated in FIG. 4). For example, a PDAF circuit 574 can be configured to determine whether the particular ALU is coupled to a PDAF pixel or an image sensing pixel, and a saturation circuit 572 can be configured to determine saturation of a data signal (e.g., either a PDAF signal or an image signal). In other embodiments, the ALU can choose a particular sequence of operation based on different circuitry and/or different factors.

In the illustrated table, regardless of the particular sequence of operation performed by the ALU, a readout timing 530 can be configured such that a Gray code (GC) to binary stage sequentially outputs a reset signal ("rst") following a 1st ramp, a first data signal ("sig1") following a 2nd ramp, and a second data signal ("sig2") following a 3rd ramp. Each of the signals is directly sent to an adder stage, which can be configured to perform at least a part of the ALU operation 538, through a wire 558 carrying the signal last output by the GC to binary stage. Furthermore, regardless of the particular sequence of operation performed by the ALU, first adder input latches 532a can be configured to latch the reset signal rst until the end of the 3rd ramp. The GC to binary stage is then configured to output the first data signal sig1.

Upon determining that the ALU is coupled to an image sensing pixel and that the first data signal sig1 (i.e., a first image signal for an image sensing pixel) is not saturated, the ALU can perform the first illustrated sequence of operations ("Sequence I"). Because the first data signal sig1 is not saturated, the pixel may be in low light conditions and performing CMS can be advantageous. Sequence I includes configuring a latch output multiplexer (e.g., the latch output multiplexer 336) to multiply outputs of the first adder input latches by −2, configuring an adder input multiplexer stage (e.g., the adder input multiplexer stage 337) to output the outputs of the latch out multiplexer, and configuring an adder stage (e.g., the adder stage 338) to sum outputs of the latch output multiplexer and the first data signal sig1 from the GC to binary stage. An adder output stage (e.g., the adder output stage 339) then divides outputs of the adder stage by 1, a second feedback multiplexer (e.g., the second feedback multiplexer 335) receives outputs of the adder output stage, and sequence I further includes configuring second adder input latches 532b to latch outputs of the adder stage from the second feedback multiplexer. At this point, the second adder input latches may have latched sig1-rst-rst. Sequence I then includes configuring the GC to binary stage to output a second data signal sig2, configuring the adder stage to sum outputs of the second adder input latches and the second data signal sig2 from the GC to binary stage, and configuring the adder output stage to divide outputs of the adder stage by 2. At this point, the outputs of the adder output stage may be (sig1+sig2)/2−rst, and second data latches 540b can be configured to then latch the outputs of the adder output stage.

Upon determining that the ALU is coupled to an image sensing pixel and that the first data signal sig1 (i.e., a first image signal for an image sensing pixel) is saturated, the ALU can perform the second illustrated sequence of operations ("Sequence II"). Because the first data signal sig1 is saturated and thus unreliable, the pixel may be in bright light conditions and performing CMS is avoided. Sequence II includes configuring the GC to binary stage to output a second data signal sig2, configuring the latch output multiplexer to multiply outputs of the first adder input latches by −1, and configuring the adder stage to sum outputs of the latch output multiplexer and the second data signal sig2 from the GC to binary stage. The adder output stage may be configured to divide the outputs of the adder stage by 1, yielding sig2-rst. Sequence II can then include configuring second data latches 540b to latch outputs of the adder output stage.

Upon determining that the ALU is coupled to a PDAF pixel and that the first data signal sig1 (e.g., a left side signal sigL for a PDAF pixel) is not saturated, the ALU can perform the third illustrated sequence of operations ("Sequence III"). Because the first data signal sig1 is not saturated, the imaging system can properly perform PDAF extraction. Sequence III includes configuring the latch output multiplexer to multiply outputs of the first adder input latches by −1, configuring the adder stage to sum outputs of the latch output multiplexer and the first data signal sig1 from the GC to binary stage, and configuring first data latches 540a to latch outputs of the adder stage, which at this point may be sig1-rst. Sequence III then includes configuring the GC to binary stage to output a second data signal sig2 (e.g., a left-and-right signal sigL+sigR for a PDAF), configuring the adder stage to sum outputs of the latch output multiplexer and the second data signal sig2 from the GC to binary stage, and configuring second data latches 540b to latch outputs of the adder stage, which at this point may be sig2-rst.

Upon determining that the ALU is coupled to an image sensing pixel and that the first data signal sig1 (e.g., a left side signal sigL for a PDAF pixel) is saturated, the ALU can perform the fourth illustrated sequence of operations ("Sequence IV"). Because the first data signal sig1 is saturated and thus unreliable, the pixel may be in bright light conditions and performing PDAF is avoided. Sequence IV includes configuring the latch output multiplexer to multiply outputs of the first adder input latches by −1 and configuring first data latches 540a to latch a PDAF saturation flag, indicating that the signal is not suitable for performing PDAF with. Sequence IV also includes configuring the GC to binary stage to output a second data signal sig2 (e.g., a left-and-right signal sigL+sigR for a PDAF), configuring the adder stage to sum outputs of the latch output multiplexer and the second data signal sig2 from the GC to binary stage, and configuring second data latches 540b to latch outputs of the adder stage, which at this point may be sig2-rst.

By performing one of Sequences I, II, III, and IV, the same ALU can perform adaptive CMS ("signal CMS") using signals from image sensing pixels and adaptive PDAF using signals from PDAF pixels without the need for additional ALUs, each adapted to perform a particular Sequence.

FIG. 6 is a table illustrating other example sequences of operations performed by an example arithmetic logic unit in accordance with the teachings of the present disclosure. It is appreciated that the sequences of operations illustrated in FIG. 6 may be example sequences of operations performed by the ALU 418 of FIG. 4, and that similarly named and numbered elements described above are coupled and function similarly below.

As shown in FIG. 6, there can be at least four different sequences of operations, labeled I, II, III, and IV. The ALU can be configured to choose among these different sequences of operations based on the outputs of a determination block (e.g., the determination block 470 illustrated in FIG. 4). For example, a PDAF circuit 674 can be configured to determine whether the particular ALU is coupled to a PDAF pixel or an image sensing pixel, and a saturation circuit 672 can be configured to determine saturation of a data signal (e.g., either a PDAF signal or an image signal). In other embodiments, the ALU can choose a particular sequence of operation based on different circuitry and/or different factors.

In the illustrated table, regardless of the particular sequence of operation performed by the ALU, a readout timing 630 can be configured such that a Gray code (GC) to binary stage sequentially outputs a first reset signal ("rst1") following a 1st ramp, a second reset signal ("rst2") following a 2nd ramp, a first data signal ("sig1") following a 3rd ramp, and a second data signal ("sig2") following a 4th ramp. Each of the signals is directly sent to an adder stage, which can be configured to perform at least a part of the ALU operation 638, through a wire 558 carrying the signal last output by the GC to binary stage. Furthermore, regardless of the particular sequence of operation performed by the ALU, second adder input latches 632b can be configured to latch the first reset signal rst1, the GC to binary stage can be configured to output the second reset signal rst2, the adder stage can be configured to sum the outputs of the second adder input latches 632b and the second reset signal rst2, the adder output stage can be configured to divide outputs of the adder stage by 2, and the first adder input latches 632a can be configured to latch the outputs of the adder output stage, which at this point may be (rst1+rst2)/2. The GC to binary stage can then be configured to output the first data signal sig1.

Upon determining that the ALU is coupled to an image sensing pixel and that the first data signal sig1 (i.e., a first image signal for an image sensing pixel) is not saturated, the ALU can perform the first illustrated sequence of operations ("Sequence I"). Because the first data signal sig1 is not saturated, the pixel may be in low light conditions and performing CMS can be advantageous. Sequence I includes configuring a latch output multiplexer to multiply outputs of the first adder input latches by −2, configuring the adder stage to sum the outputs of the latch output multiplexer and the first data signal sig1 from the GC to binary stage, and configuring the second adder input latches 632b to latch the outputs of the adder stage. Sequence I also includes configuring the GC to binary stage to output the second data signal sig2, configuring the adder stage to sum outputs of the second adder input latches 632b and the second data signal sig2 from the GC to binary stage, and configuring the adder output stage to divide outputs of the adder stage by 2. At this point, the outputs of the adder output stage may be (sig1+sig2-rst1-rst2)/2, and second data latches 640b can be configured to then latch the outputs of the adder output stage.

Upon determining that the ALU is coupled to an image sensing pixel and that the first data signal sig1 (i.e., a first image signal for an image sensing pixel) is saturated, the ALU can perform the second illustrated sequence of operations ("Sequence II"). Because the first data signal sig1 is saturated and thus unreliable, the pixel may be in bright light conditions and performing CMS is avoided. Sequence II includes configuring the latch output multiplexer to multiply outputs of the first adder input latches 632a by −1, configuring the GC to binary stage to output the second data signal sig2, and configuring the adder stage to sum the outputs of the first adder input latches 632a and the first data signal sig2 from the GC to binary stage, yielding sig2-rst, where rst is the average of the first and second reset signals (i.e., (rst1+rst2)/2). Sequence II can then include configuring second data latches 640b to latch outputs of the adder stage.

Upon determining that the ALU is coupled to a PDAF pixel and that the first data signal sig1 (e.g., a left side signal sigL for a PDAF pixel) is not saturated, the ALU can perform the third illustrated sequence of operations ("Sequence III"). Because the first data signal sig1 is not saturated, the imaging system can properly perform PDAF extraction. Sequence III includes configuring the latch output multiplexer to multiply outputs of the first adder input latches 632a by −1, configuring the adder stage to sum outputs of the latch output multiplexer and the first data signal sig1 from the GC to binary stage, and configuring first data latches 640a to latch outputs of the adder stage. Afterward, Sequence III includes configuring the GC to binary stage to output the second data signal sig2 (e.g., a left-and-right signal sigL+sigR for a PDAF), configuring the adder stage to sum the outputs of the latch output multiplexer and the second data signal sig2 from the GC to binary stage, and configuring second data latches 640b to latch outputs of the adder stage, which at this point may be sig2-rst.

Upon determining that the ALU is coupled to an image sensing pixel and that the first data signal sig1 (e.g., a left side signal sigL for a PDAF pixel) is saturated, the ALU can perform the fourth illustrated sequence of operations ("Sequence IV"). Because the first data signal sig1 is saturated and thus unreliable, the pixel may be in bright light conditions and performing PDAF is avoided. Sequence IV includes configuring the latch output multiplexer to multiply outputs of the first adder input latches 632a by −1 and configuring first data latches 640a to latch a PDAF saturation flag, indicating that the signal is not suitable for performing PDAF with. Sequence IV also includes configuring the GC to binary stage to output the second data signal sig2 (e.g., a left-and-right signal sigL+sigR for a PDAF), configuring the adder stage to sum outputs of the latch output multiplexer and the second data signal sig2 from the GC to binary stage, and configuring second data latches 640b to latch outputs of the adder stage, which at this point may be sig2-rst.

By performing one of Sequences I, II, III, and IV, the same ALU can perform adaptive CMS ("true CMS") using signals from image sensing pixels and adaptive PDAF using signals from PDAF pixels without the need for additional ALUs, each adapted to perform a particular Sequence.

Figure 7:
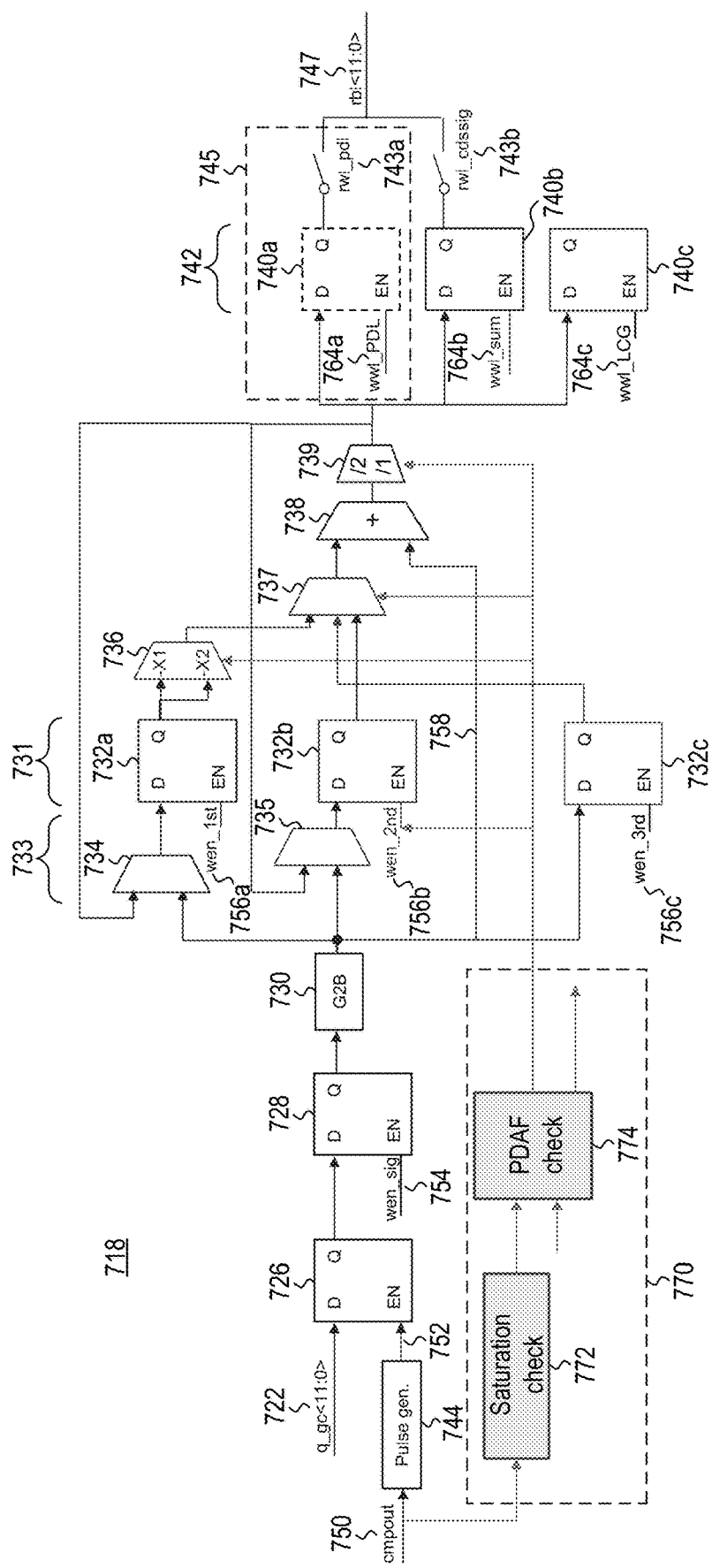
FIG. 7 illustrates a portion of another example arithmetic logic unit in accordance with the teachings of the present disclosure.

FIG. 7 illustrates a portion of another example arithmetic logic unit 718 in accordance with the teachings of the present disclosure. It is appreciated that the ALU 718 of FIG. 7 may be an example of one of the ALUs 218 included in readout circuit 206 as shown in FIG. 2, and that similarly named and numbered elements described above are coupled and function similarly below. It is also appreciated that the portion of ALU 718 depicted in FIG. 7 illustrates circuitry that processes one of the bits of an ALU 718. For instance, in the various examples, it is noted that each one of the plurality of ALUs 718 is coupled to sample and hold or latch a corresponding bit of a received 12-bit Gray code q_gc<11:0> 722 in response to the arrival of a falling edge of comparator output cmpout 750 to complete the analog-to-digital conversion by converting the latched 12-bit Gray code q_gc<11:0> 722 to a binary value.

To illustrate, the example ALU 718 shown in FIG. 7 includes a front end latch stage 726 coupled to receive and latch a respective bit of Gray code q_gc<11:0> 722 signal in response to comparator output cmpout 750. In the illustrated example, each latch of front end latch stage 726 has a data input "D" coupled to receive the respective bit of Gray code q_gc<11:0>. ALU 718 also includes a pulse generator 744 that is coupled to receive the comparator output cmpout 750 from the respective comparator (e.g., comparator 216) of the column. In one example, the pulse generator 744 is coupled to generate a front end latch enable signal 752 in response to the arrival of a falling edge in the comparator output cmpout 750. In one example, the pulse of front end latch enable signal 752 is coupled to an enable input of each latch of front end latch stage 726.

In the depicted example, ALU 718 also includes a signal latch stage 728 coupled to the output of the front end latch stage 726. In operation, the signal latch stage 728 is coupled to latch outputs of the front end latch stage 726 in response to a signal latch enable signal wen_sig 754. As shown in the depicted example, each latch of the signal latch stage 728 includes a data input "D" coupled to the "Q" output of a respective one of latches of the front end latch stage 726. The example in FIG. 7 shows that ALU 718 also includes a GC to binary stage (e.g., G2B) 730 that is coupled to generate binary representations of the Gray code q_gc<11: 0> 722 signal values latched in the front end latch stage 726. In one example, GC to binary stage 730 includes a plurality of exclusive-OR gates (not shown), each of which has an output coupled to generate the corresponding binary bit, and a first input coupled to receive a respective "Q" output of the respective latch of signal latch stage 728.

As shown in the depicted example depicted in FIG. 7, the ALU 718 also includes an adder stage 738, which includes a plurality of full adders, each of which having a first input coupled to an output of the GC to binary stage 730 through wire 758, and a second input coupled to an output of an adder input multiplexer stage 737, which will be described in greater detail below. In operation, the outputs of the adder stage 738 are generated in response to the first inputs from the GC to binary stage 730 and the second inputs from the adder input multiplexer stage 737, and sent to an adder output stage 739, which is configured to divide the outputs of the adder stage by either 1 or 2. In one example, the outputs of adder stage 738 are configured to determine the difference between the values received at the first inputs and the values received at second inputs of the adder input multiplexer stage 737.

Continuing with the example depicted in FIG. 7, the ALU 718 further includes an adder input latch stage 731 coupled to latch outputs of the GC to binary stage 730. In one example, the adder input latch stage 731 includes first adder input latches 732a, which are configured to latch the outputs of the GC to binary stage 730 in response to a first adder input latch enable signal wen_1st 756a. In the example, the adder input stage 731 also includes second adder input latches 732b, which are configured to latch the outputs of the GC to binary stage 730 in response to a second adder input latch enable signal wen_2nd 756b. The adder input stage 731 can further include third adder input latches 732c configured to latch the outputs of the GC to binary stage 730 in response to a third adder input latch enable signal wen_3rd 756c. The third adder input latches 732c can be configured to latch low conversion gain (LCG) signals, enabling the ALU 718 to perform dual conversion gain (DCG) calculations. Third inputs of the adder input multiplexer stage 737 can be coupled to receive outputs of the third adder input latches 732c.

In the depicted example, a latch output multiplexer 736 is coupled to receive outputs of the first adder input latches 732a and is configured to multiply the outputs of the first adder input latches by either −1 or −2. Alternatively, the adder stage 738 can be used to effectively multiply the outputs of the first adder input latches by either −1 or −2.

The ALU 718 can also include a feedback multiplexer stage 733 coupled to receive the outputs of the GC to binary stage 730. In the illustrated example, the feedback multiplexer stage 733 includes a first feedback multiplexer 734 with first inputs coupled to receive outputs of the adder output stage 739 and second inputs coupled to receive the outputs of the GC to binary stage 730, and a second feedback multiplexer 735 with first inputs coupled to receive outputs of the adder output stage 739 and second inputs coupled to receive the outputs of the GC to binary stage 730. In operation, the first adder input latches 732a are coupled to latch outputs of the first feedback multiplexer 734, and the second adder input latches 732b are coupled to latch outputs of the second feedback multiplexer 735.

The example in FIG. 7 shows that ALU 718 also includes a data latch stage 742 coupled to latch outputs of the adder output stage 739. As shown in the depicted example, the data latch stage 742 includes first data latches 740a, second data latches 740b, and third data latches 740c. The first data latches 740a are configured to latch phase detection signals from the outputs of the adder output stage 739 in response to a first data latch enable signal wwl_PDL 764a, the second data latches 740b are configured to latch image data signals from the outputs of the adder output stage 739 in response to a second data latch enable signal wwl_sum 764b, and the third data latches 740c are configured to latch LCG image data signals from the outputs of the adder output stage 739 in response to a third data latch enable signal wwl_LCG 764c. In the illustrated example, the phase detection signals latched in first data latches 740a and the image data signals latched in second data latches 740b are output from ALU 718 as output bits rbl<11:0> 747 through output switches rwl_pdl 743a and rwl_cdssig 743b, respectively.

ALU 718 can also include a determination block 770 coupled to receive the comparator output cmpout 750 and configured to output at least one of the second adder input latch enable signal wen_2nd 756b, a control signal for the latch output multiplexer 736, a control signal for the adder input multiplexer stage 737, and a control signal for the adder output stage 739. The determination block 770 can include at least one of a saturation circuit 772 configured to determine saturation of a signal (e.g., a PDAF signal, an image signal) and a PDAF circuit 774 configured to determine whether the particular ALU 718 is coupled to a PDAF pixel or an image sensing pixel. Similar to the operations described in detail above with respect to FIGS. 5 and 6, the determination block 770 can control the specific operations performed by the ALU 718 based on whether a PDAF pixel or an image sensing pixel is coupled, and whether a data signal is saturated. In other embodiments, the determination block 770 can be external to the ALU 718.

The above description of illustrated examples of the disclosure, including what is described in the Abstract, is not intended to be exhaustive or to limit the disclosure to the precise forms disclosed. While specific examples of the disclosure are described herein for illustrative purposes, various modifications are possible within the scope of the disclosure, as those skilled in the relevant art will recognize.

These modifications can be made to the disclosure in light of the above detailed description. The terms used in the following claims should not be construed to limit the disclosure to the specific examples disclosed in the specification. Rather, the scope of the disclosure is to be determined entirely by the following claims, which are to be construed in accordance with established doctrines of claim interpretation.

What is claimed is:

1. An arithmetic logic unit (ALU), comprising:
 a front end latch stage coupled to a Gray code (GC) generator to latch GC outputs of the GC generator in response to a comparator output;
 a signal latch stage coupled to latch outputs of the front end latch stage in response to a signal latch enable signal;
 a GC to binary stage coupled to generate a binary representation of the GC outputs latched in the signal latch stage;
 an adder stage including first inputs and second inputs, wherein the first inputs of the adder stage are coupled to receive outputs of the GC to binary stage, wherein outputs of the adder stage are generated in response to the first inputs and the second inputs of the adder stage;

an adder output stage coupled to receive the outputs of the adder stage, wherein the adder output stage is configured to divide the outputs of the adder stage by either 1 or 2;

an adder input latch stage coupled to latch outputs of the GC to binary stage, wherein the adder input latch stage comprises:
first adder input latches configured to latch the outputs of the GC to binary stage in response to a first adder input latch enable signal, and
second adder input latches configured to latch the outputs of the GC to binary stage in response to a second adder input latch enable signal;

a feedback multiplexer stage coupled to receive the outputs of the GC to binary stage, wherein the feedback multiplexer stage comprises:
a first feedback multiplexer with first inputs coupled to receive outputs of the adder output stage and second inputs coupled to receive the outputs of the GC to binary stage, and
a second feedback multiplexer with first inputs coupled to receive outputs of the adder output stage and second inputs coupled to receive the outputs of the GC to binary stage;

a latch output multiplexer coupled to receive outputs of the first adder input latches, wherein the latch output multiplexer is configured to multiply the outputs of the first adder input latches by either −1 or −2; and an adder input multiplexer stage, wherein first inputs of the adder input multiplexer stage are coupled to receive outputs of the latch output multiplexer and second inputs of the adder input multiplexer stage are coupled to receive outputs of the second adder input latches.

2. The ALU of claim 1, further comprising a determination block coupled to receive the comparator output and configured to output at least one of the second adder input latch enable signal, a control signal for the latch output multiplexer, a control signal for the adder input multiplexer stage, and/or a control signal for the adder output stage.

3. The ALU of claim 2, wherein the determination block comprises a saturation circuit configured to determine saturation of a first data signal.

4. The ALU of claim 2, wherein the determination block comprises a phase detection auto focus (PDAF) circuit configured to determine whether the ALU is coupled to a PDAF pixel or an image sensing pixel.

5. The ALU of claim 2, wherein the determination block comprises:
a saturation circuit configured to determine saturation of a signal; and
a phase detection auto focus (PDAF) circuit configured to determine whether the ALU is coupled to a PDAF pixel or an image sensing pixel.

6. The ALU of claim 1, further comprising a data latch stage coupled to latch outputs of the adder output stage, wherein the data latch stage comprises:
first data latches configured to latch phase detection signals from the outputs of the adder output stage in response to a first data latch enable signal; and
second data latches configured to latch image data signals from the outputs of the adder output stage in response to a second data latch enable signal.

7. The ALU of claim 6, wherein the data latch stage further comprises third data latches configured to latch low conversion gain (LCG) image data signals from the outputs of the adder output stage in response to a third data latch enable signal.

8. The ALU of claim 1, wherein the adder input latch stage further comprises third adder input latches configured to latch the outputs of the GC to binary stage in response to a third adder input latch enable signal, and wherein third inputs of the adder input multiplexer stage are coupled to receive outputs of the third adder input latches.

9. An arithmetic logic unit (ALU), comprising:
a Gray code (GC) to binary stage configured to generate binary representations of GC signals;
an adder stage including first inputs coupled to receive outputs of the GC to binary stage;
an adder output stage coupled to receive outputs of the adder stage;
an adder input latch stage coupled to latch outputs of the GC to binary stage, the adder input latch stage including first adder input latches and second adder input latches;
a feedback multiplexer stage coupled to receive the outputs of the GC to binary stage;
a latch output multiplexer coupled to receive outputs of the first adder input latches, wherein the latch output multiplexer is configured to multiply the outputs of the first adder input latches; and
an adder input multiplexer stage, wherein first inputs of the adder input multiplexer stage are coupled to receive outputs of the latch output multiplexer, and wherein second inputs of the adder input multiplexer stage are coupled to receive outputs of the second adder input latches.

10. The ALU of claim 9, further comprising:
a front end latch stage coupled to latch Gray code signals in response to a comparator output; and
a signal latch stage coupled to latch outputs of the front end latch stage in response to a signal latch enable signal.

11. The ALU of claim 10, wherein the GC to binary stage is coupled to generate the binary representations of the GC signals latched in the signal latch stage.

12. The ALU of claim 9, wherein the adder output stage is configured to divide the outputs of the adder stage by either 1 or 2.

13. The ALU of claim 9, wherein the feedback multiplexer stage includes:
a first feedback multiplexer with first inputs coupled to receive outputs of the adder output stage and second inputs coupled to receive the outputs of the GC to binary stage; and
a second feedback multiplexer with first inputs coupled to receive outputs of the adder output stage and second inputs coupled to receive the outputs of the GC to binary stage.

14. The ALU of claim 13, wherein:
the first adder input latches are coupled to latch outputs of the first feedback multiplexer; and
the second adder input latches are coupled to latch outputs of the second feedback multiplexer.

15. The ALU of claim 9, further comprising a determination block configured to output a second adder input latch enable signal, a control signal for the latch output multiplexer, a control signal for the adder input multiplexer stage, and/or a control signal for the adder output stage.

16. An arithmetic logic unit (ALU), comprising:
a front end latch stage configured to latch Gray code (GC) signals;

a signal latch stage coupled to latch outputs of the front end latch stage;

a GC to binary stage coupled to generate binary representations of the GC signals latched in the signal latch stage;

an adder stage including first inputs coupled to receive outputs of the GC to binary stage;

an adder output stage coupled to receive outputs of the adder stage;

an adder input latch stage coupled to latch outputs of the GC to binary stage, the adder input latch stage including first adder input latches and second adder input latches; and a data latch stage coupled to latch outputs of the adder output stage, the data latch stage including first data latches configured to latch phase detection signals and second data latches configured to latch image data signals.

17. The ALU of claim 16, further comprising a feedback multiplexer stage coupled to receive the outputs of the GC to binary stage, the feedback multiplexer stage including:

a first feedback multiplexer with first inputs coupled to receive outputs of the adder output stage and second inputs coupled to receive the outputs of the GC to binary stage; and a second feedback multiplexer with first inputs coupled to receive outputs of the adder output stage and second inputs coupled to receive the outputs of the GC to binary stage.

18. The ALU of claim 17, wherein:

the first adder input latches are coupled to latch outputs of the first feedback multiplexer; and the second adder input latches are coupled to latch outputs of the second feedback multiplexer.

19. The ALU of claim 18, further comprising a latch output multiplexer coupled to receive outputs of the first adder input latches and configured to multiply the outputs of the first adder input latches by either −1 or −2.

* * * * *